United States Patent
Van Eekelen (10) Patent No.: US 11,953,915 B2
(45) Date of Patent: Apr. 9, 2024

(54) SYSTEM AND METHOD FOR THE INTRALOGISTIC TRANSPORT OF PRODUCTS

(71) Applicant: Vanderlande Industries B.V., Veghel (NL)

(72) Inventor: Jozef Antonius Wilhelmus Maria Van Eekelen, Veghel (NL)

(73) Assignee: Vanderlande Industries B.V. (NL)

( * ) Notice: Subject to any disclaimer, the term of this patent is extended or adjusted under 35 U.S.C. 154(b) by 386 days.

(21) Appl. No.: 17/441,480

(22) PCT Filed: Mar. 19, 2020

(86) PCT No.: PCT/NL2020/050182
§ 371 (c)(1),
(2) Date: Sep. 21, 2021

(87) PCT Pub. No.: WO2020/197383
PCT Pub. Date: Oct. 1, 2020

(65) Prior Publication Data
US 2022/0147060 A1 May 12, 2022

(30) Foreign Application Priority Data
Mar. 25, 2019 (NL) ...................... 2022800

(51) Int. Cl.
*G05D 1/02* (2020.01)
*G05D 1/00* (2006.01)
(52) U.S. Cl.
CPC ......... *G05D 1/0297* (2013.01); *G05D 1/0274* (2013.01); *G05D 1/0293* (2013.01); *G05D 2201/0216* (2013.01)

(58) Field of Classification Search
CPC .. G05D 1/0297; G05D 1/0274; G05D 1/0293; G05D 2201/0216; G05D 1/0219; G05D 2201/02; B65G 43/10; B64F 1/324
See application file for complete search history.

(56) References Cited

U.S. PATENT DOCUMENTS

| 7,912,574 | B2 | 3/2011 | Wurman et al. |
| 10,037,027 | B2 | 7/2018 | Dabrowski |
| 2006/0149465 | A1 | 7/2006 | Park et al. |

FOREIGN PATENT DOCUMENTS

| CN | 107323572 A | 11/2017 |
| CN | 107963475 A | 4/2018 |

(Continued)

OTHER PUBLICATIONS

International Search Report and Written Opinion dated Feb. 5, 2021 issued in corresponding PCT Appln. No. PCT/NL2020/050182.

*Primary Examiner* — Rodney A Butler
(74) *Attorney, Agent, or Firm* — Carter, DeLuca & Farrell LLP (57) ABSTRACT

The invention provides, inter alia, a system for the intralogistic transport of products, comprising—a number of vehicles, where each vehicle is designed to turn on a vertical turning axis where, viewed from above, there is a maximum distance amax between the vertical turning axis and a point on the periphery of the vehicle; —a central control device that is designed to transmit control signals to on-board control devices of the vehicles, wherein the central control device and/or the on-board control device of at least a portion of the number of vehicles comprise a digitized grid of grid points that represents a movement area or at least a portion thereof, which grid points are arranged at least partially according to a hexagonal pattern where the distance between neighbouring grid points is equal to distance d, which distance d is greater than 2.0 times the maximum (Continued)

distance amax, wherein the central control device and/or the on-board control device of at least a portion of the number of vehicles are designed to move a vehicle within a strip, which strip consists of at least two mutually connected straight strip portions that run parallel to one of three directional lines defined by pairs of grid points.

29 Claims, 4 Drawing Sheets

(56) References Cited

FOREIGN PATENT DOCUMENTS

| | | |
|---|---|---|
| CN | 208377742 U | 1/2019 |
| WO | 2007053938 A1 | 5/2007 |
| WO | 2018214673 A1 | 11/2018 |

SYSTEM AND METHOD FOR THE INTRALOGISTIC TRANSPORT OF PRODUCTS

CROSS-REFERENCE TO RELATED APPLICATION

This application is a National Stage Application under 35 U.S.C. § 371(a) of PCT/NL2020/050182, filed Mar. 19, 2020, which claims the benefit of and priority to Netherlands Patent Application No. 2022800 filed Mar. 25, 2019. The entire contents of all of the foregoing applications are incorporated by reference herein.

BACKGROUND

The invention relates to a system for the intralogistic transport of products. Such a system may be used, for example, for the transport of items of baggage in an airport or for the transport of packages to the end of processing/ sorting same. Intralogistic transport refers to the situation in which products are transported within the confines of a site of operations. The present invention targets in particular, but not exclusively, the situation in which the transport takes place under cover, typically in a hall.

United States publication U.S. Pat. No. 7,912,574 B2 describes a system for transporting products in which a movement area in the form of a floor is divided into square cells. The centres of these cells can be considered as grid points which, given the square shape of the cells, are arranged in a squared pattern. Depending on the position of a cell within the movement area, each cell has at most four adjacent cells. A portion of the cells is used for the temporary storage of holding members therein. Another portion of the cells is used for moving the holding members via these cells by means of self-driving vehicles. The dimensions of the cells are chosen to be slightly greater than those of the holding members, so that the holding members each just fit inside a cell. The vehicles are designed to drive underneath the holding members and to lift them up. Viewed from above, a holding member carried by a vehicle protrudes from the vehicle. The control of each vehicle is designed so that each vehicle is able to turn within a cell by 90 degrees or a multiple thereof without a holding member carried by the vehicle then turning along therewith. Since the vehicles move exclusively from one cell to a neighbouring cell, each vehicle moves, with or without a holding member, along trajectories of movement within the movement area that are oriented perpendicularly to one another, with the vehicles and the holding members covering strip portions of the floor that are oriented perpendicularly to one another. Due to the fact that each holding member only just fits inside a cell, the hypothetical turning of the holding members is not possible within a cell since, in turning, the holding member would inevitably protrude from the cell, which is undesirable. To be able to turn the holding members too, U.S. Pat. No. 7,912, 574 B2 describes the use of larger square cells, the sides of which are twice the length of and the area of which is therefore twice that of the cells used in the preceding description.

SUMMARY

The object of the invention is to provide a system in which the movement area is used efficiently. To this end, the invention provides, according to a first aspect, a system according to Claim 1. Each grid point of the grid points that are arranged in a hexagonal pattern can then be considered as the centre of a cell or tile in the shape of a hexagon, with the cells in question bordering one another. In any case, with the invention, partly because of the measure that distance d is greater than 2.0 times the maximum distance $a_{max}$, it is guaranteed that if two vehicles are positioned such that their respective vertical turning axes are located directly above two grid points that are located distance d from one another, and turn simultaneously on their respective turning axes, these vehicles and/or the products carried by the vehicles, in so far as these products, viewed from above, do not protrude from the periphery of the vehicles, do not collide with one another because, when turning, each vehicle stays within the hexagonal cell associated with the grid point in question. In addition, the hexagonal orientation of the grid of grid points affords the advantage that, despite the above guarantee, the density of the grid points can be higher than in the case of square cells. Furthermore, by virtue of the hexagonal orientation of the grid points, the distance covered by a vehicle between two grid points within the movement area may be smaller. In particular, in the case of a vehicle making a large number of movements between given grid points, the total distance covered by the vehicles may be smaller in the case of a hexagonal orientation of the grid points than in the case of a rectangular orientation of the grid points. Within the context of the invention, the strip within which a vehicle moves from the first grid point to the second grid point does not comprise a straight strip that does not run parallel to one of the three directional lines.

The area of the floor can in particular be used efficiently if distance d is smaller than 2.2 times the maximum distance $a_{max}$.

Generally speaking, it can be advantageous if each vehicle, viewed from above, takes a rectangular shape with a length l and a width b. This embodiment does not rule out the corners of the vehicle being rounded or the four sides of the rectangular shape not being perfectly straight.

The area of the floor can in particular further be used efficiently if the ratio of the width b to the length l of the vehicle is between 0.60 to 1.00 and 0.82 to 1.00, more preferably between 0.65 to 1.00 and 0.77 to 1.00.

To reduce the risk of collision with other vehicles further, in one embodiment the distance d is greater than twice the width of the vehicle. The width of the vehicle refers to the maximum dimension of the vehicle in a direction perpendicular to the normal direction of movement of the vehicle, viewed from above. It is possible for this maximum dimension to be greater than the maximum dimension of the vehicle in a direction parallel to the normal direction of movement of the vehicle, viewed from above.

The invention is suitable in particular, but not exclusively, for use with a system in which the carrying member of the vehicle is designed to carry a product in a first state of the carrying member and to unload a product in a second state of the carrying member. The system is therefore highly suited to the sorting of products. Incidentally, it should be noted that in particular the loading of the vehicle with a product, but in principle also the unloading of the product, may take place manually, in which case it is also expressly possible for the carrying member to be rigidly connected to the frame of the vehicle or at least for the carrying member not to have the ability to assume the aforementioned, mutually different, first and second states.

In one embodiment, the carrying member assumes a horizontal orientation in the first state and a sloping orientation in the second state so as to cause a product to slide off the carrying member under the effect of gravity in the second state. A vehicle with such a carrying member is at least known per se from publications CN 208377742 U1 and WO 2018/214673 A1.

In an alternative embodiment, the carrying member comprises a conveyor belt or conveyor strip that is designed to allow a product to rest thereon and to remain still in the first state and to be driven in the second state. A vehicle with such a carrying member is at least known per se from publications CN 107963475 and CN 107323572.

In order to render the system suitable for sorting products therewith, the system is provided, in a further embodiment, with at least one pick-up position within or directly adjacent to the movement area for a product to be picked up and carried from a pick-up position by the carrying member of a vehicle and the system is further provided with at least one delivery position within or directly adjacent to the movement area for a product to be unloaded at a delivery position by the carrying member of the vehicle. A pick-up position may for example be formed by the end of a conveyor, such as a conveyor belt that is provided above the carrying member, which conveyor transfers a product to the carrying member at the pick-up position. In particular if the vehicle drives underneath the conveyor at the same speed and in the same direction as the conveyor, the loading of the carrying member of the vehicle can take place while the vehicle is driving. A delivery position can also be formed by the end of a conveyor, where a product is unloaded onto the end of the conveyor and thence carried away by the conveyor.

A suitable embodiment of the system at a delivery position can be obtained if at least one delivery position comprises a hole in the floor, where, in a further embodiment, a chute is connected to the hole in the floor.

The present invention is also suitable for use with a system in which the vehicle is used to store holding members with or without products temporarily in storage positions within a movement area. Such holding members are known from aforementioned publication U.S. Pat. No. 7,912,574 B2 and are denoted therein by reference numeral 30. The holding member in question can be described as a frame on legs, where the vehicle can drive between the legs and under the frame and thence can lift the frame up, with the legs coming off the floor. Alternatively, a holding member could also take the form of a tray, for example, in particular for items of baggage. According to a second aspect, the invention provides a system according to Claim 12 for such uses. The measure that $x_{max}$ is greater than $a_{max}$ implies that the holding member determines the diameter of the circle within which a vehicle with a holding member carried by the carrying member of the vehicle moves when turning on the vertical turning axis. For reasons corresponding to those for which, in the case of the system according to the first aspect of the invention, distance d is greater than 2.0 times the maximum distance $a_{max}$, in the case of the system according to the second aspect of the invention, distance d is greater than 2.0 times the maximum distance $x_{max}$.

The area of the floor can in particular be used efficiently if distance d is smaller than 2.2 times the maximum distance $x_{max}$.

Generally speaking, it may be advantageous if each holding member, viewed from above, takes a rectangular shape with a length l and a width b.

The area of the floor may furthermore be used efficiently in particular if the ratio of the width b to the length l of the holding member is between 0.60 to 1.00 and 0.82 to 1.00, more preferably between 0.65 to 1.00 and 0.77 to 1.00. In one embodiment, the distance d is greater than twice the width of the holding member in order to reduce the risk of collision with other vehicles and/or with holding members carried by other vehicles. The width of the holding member refers to the maximum dimension of the holding member in a direction perpendicular to the normal direction of movement of the vehicle when the holding member is being carried by the vehicle, viewed from above. It is possible for this maximum dimension to be greater than the maximum dimension of the holding member in a direction parallel to the normal direction of movement of the vehicle, viewed from above.

An efficient way of transporting a holding member can be obtained if the carrying member and the holding member are designed for the holding member to be carried in a first state of the carrying member and for the holding member to be unloaded in a second state of the carrying member.

More specifically, in one embodiment, the carrying member operates in the first state so as to lift a holding member up off the floor and in the second state so as to set the holding member down on the floor on legs thereof in the second state. A vehicle with a carrying member that can assume such a first state and such a second state is also known per se from U.S. Pat. No. 7,912,574 B2 and is denoted by reference numeral 20. The carrying member of this known vehicle is however rotatable on a vertical axis of rotation relative to the frame of the vehicle. This is not necessary with the present invention, as a result of which the vehicles with the system according to the second aspect of the invention can be made simpler, namely with a non-rotatable carrying member.

To the end of using the system so as to be able to store products temporarily on holding members by means thereof, the system is provided, in a further embodiment, with at least one pick-up position within the movement area for a holding member to be lifted up off the floor at a pick-up position by the carrying member of a vehicle, and with at least one delivery position within the movement area for the holding member to be set down on the floor at a delivery position.

If the holding members are designed as trays, which may or may not contain products, the handling of the holding members by the vehicles can take place in the same way as the handling of a product by a vehicle, which product is carried directly by a carrying member of the vehicle, as already explained above. Incidentally, the trays may also be stored temporarily in storage positions within the movement area.

Both for the system according to the first aspect of the invention and for the system according to the second aspect of the invention, it may be preferable for the central control device and/or the on-board control device of at least a portion of the number of vehicles to be designed to allow a vehicle to reach an interlying grid point from a grid point neighbouring the interlying grid point exclusively in at most five directions of approach and subsequently to leave an interlying grid point for a grid point neighbouring the interlying grid point again exclusively in at most five directions of departure, where the respective directions of approach and of departure are not opposite one another. Thus, a collision between two vehicles moving in mutually directly opposite directions is prevented. A further advantage is that the required computing power is lower than it would be if the directions of approach and of departure were allowed to be opposite one another.

Buildings in which a system according to the invention could be used are mostly not hexagonally oriented but rather orthogonally oriented, for example because pillars are provided at regular distances apart from one another in a rectangular pattern. Improved use of the area of the floor can then be achieved if the central control device and/or the on-board control device of at least a portion of the number of vehicles comprise, within a first grid area, a digitized first grid portion of first grid points that represents a first portion of the movement area, which first grid points are arranged according to a first hexagonal pattern, and comprise, within a second grid area, a digitized second grid portion of grid points that represents a second portion of the movement area, which grid points are arranged according to a second hexagonal pattern, and comprise a third area that comprises at least one grid point between the first grid area and the second grid area where the first hexagonal pattern and the second hexagonal pattern are rotated relative to one another by an angle.

The aforementioned advantage may in particular apply if the first hexagonal pattern and the second hexagonal pattern are rotated relative to one another by an angle of 30 degrees, resulting in the first grid area and the second grid area being oriented at right angles to one another.

An alternative way of efficiently using the area of a floor in a room can be obtained if the central control device and/or the on-board control device of at least a portion of the number of vehicles comprise, within a first grid area, a digitized first grid portion of first grid points that represents a first portion of the movement area, which first grid points are arranged according to a first hexagonal pattern, and comprise, within a second grid area, a digitized second grid portion of grid points that represents a second portion of the movement area, which grid points are arranged according to a rectangular pattern, preferably a squared pattern, and comprise a third area that comprises at least one grid point between the first grid area and the second grid area.

To decrease the risk of vehicles colliding and/or to decrease the computing power that is needed to prevent such collisions, the system comprises, in one embodiment, a number of delivery positions that are provided in a regular pattern in rows within the movement area, which rows run parallel to the three directional lines, and wherein a least one row of grid points is provided between neighbouring rows of delivery positions, where the central control device and/or the on-board control device of at least a portion of the number of vehicles are designed to move vehicles over the grid points of a row in only one direction of movement.

Partly depending on the required capacity of the system, it is in this case possible for two rows of grid points to be provided between neighbouring rows of delivery positions, where the central control device and/or the on-board control device of at least a portion of the number of vehicles are designed to move vehicles over the grid points of a first row of the two rows of grid points and of a second row of the two rows of grid points in opposite directions of movement, and/or for single rows of grid points to be provided between neighbouring rows of delivery positions, thus not more than one for each pair of neighbouring rows of delivery positions, where, optionally, the central control device and/or the on-board control device of at least a portion of the number of vehicles are designed to move vehicles over the grid points of neighbouring rows of grid points in opposite directions of movement.

The present invention further provides a method for using a system according to the first aspect of the invention, comprising the successive steps of
picking up and carrying a product from a third grid point using the carrying member of a vehicle where, viewed from above, the product is positioned within the periphery of the vehicle;
moving the vehicle with the product from a first grid point to a second grid point within a strip that runs between the first grid point and the second grid point, where the direct connecting line between the first grid point and the second grid point does not run parallel to one of the three directional lines, where the strip consists of at least two mutually connected straight strip portions, each of which runs parallel to and over one of the three directional lines.

In the context of the description in the preceding paragraph, the term "strip" is understood as referring to that portion of the area of the floor which, viewed from above, is covered by the vehicle as said vehicle moves from the first grid point to the second grid point. At the connection between the strip portions, and more specifically in the hexagonal cell associated with the grid point where the two different directional lines intersect, the vehicle thus changes direction. It is in this case possible for the vehicle simultaneously to move and to turn on the vertical turning axis of the vehicle at the connection of the straight strip portions if the distance d and the shape and dimensions of the vehicle are such that, despite the simultaneous turning and moving of the vehicle, the vehicle will not project beyond said hexagonal cell. In other words, the vehicle does not necessarily have to be stationary when turning on the vertical turning axis.

The present invention further provides a method for using a system according to the second aspect of the invention, comprising the successive steps of
picking up and carrying a holding member from a third grid point using the carrying member of a vehicle;
moving the vehicle with the holding member from a first grid point to a second grid point within a strip that runs between the first grid point and the second grid point, where the direct connecting line between the first grid point and the second grid point does not run parallel to one of the three directional lines, where the strip consists of at least two mutually connected straight strip portions, each of which runs parallel to and over one of the three directional lines.

In the context of the description in the preceding paragraph, the term "strip" is understood as referring to that portion of the area of the floor which, viewed from above, is covered by the holding member carried by the vehicle as said vehicle moves from the first grid point to the second grid point.

BRIEF DESCRIPTION OF THE DRAWINGS

The invention will be explained in more detail by means of the description of a number of possible embodiments of a system according to the invention with reference to the following figures.

DETAILED DESCRIPTION

Figure 1:
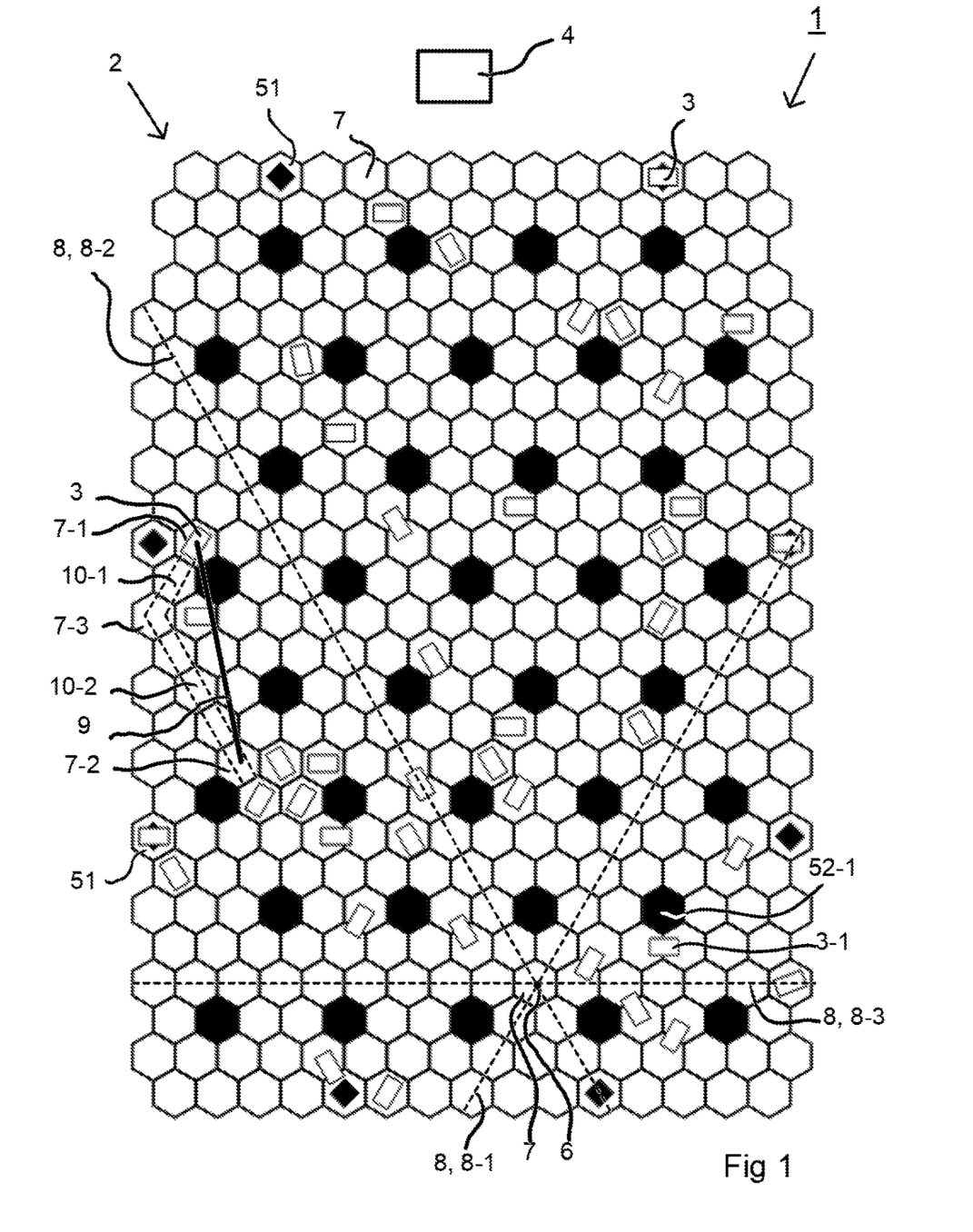
FIG. 1 schematically shows a system from above.
Figure 2:
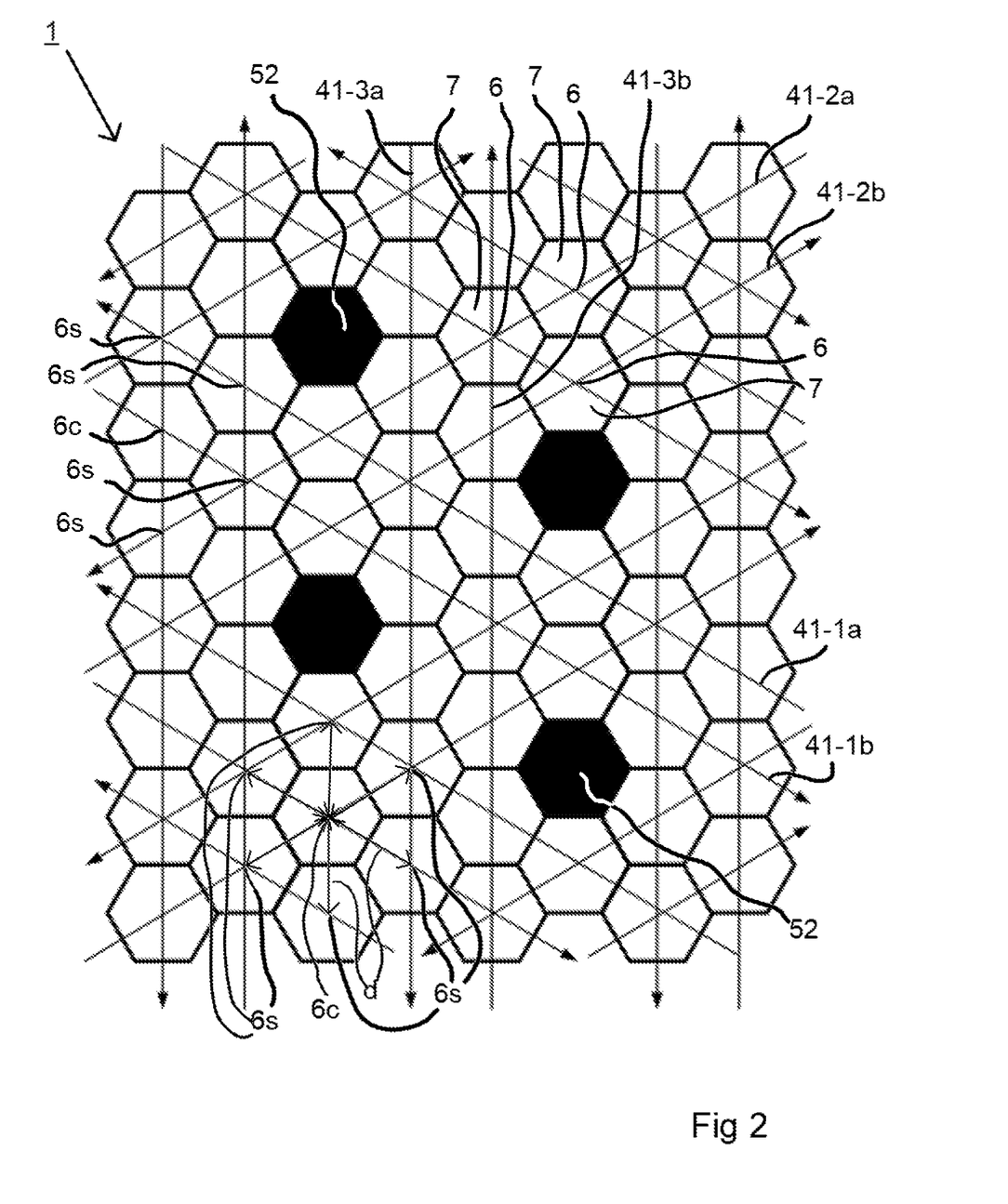
FIG. 2 shows a portion of FIG. 1 from above.
Figure 4A:
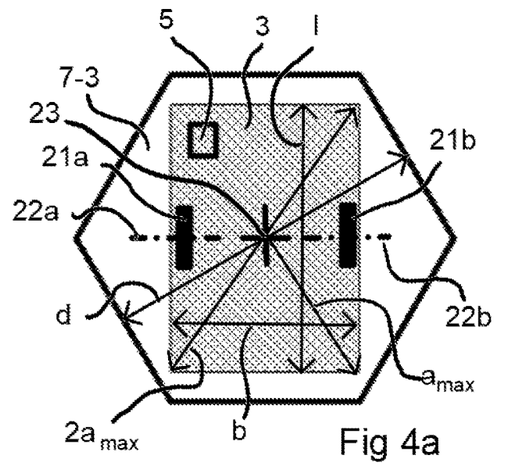
FIGS. 4a, 4b show a hexagonal tile with a vehicle thereon.

System 1 according to FIGS. 1 and 2 exhibits a movement area 2 with a number of self-driving vehicles 3 that are designed to move within the movement area 2. The movement area 2 is actually formed by a portion of a floor, typically a floor under cover inside a hall. To control the movements of vehicles 3, the system 1 is provided with a central control device 4 and each vehicle 3 is provided with an on-board controller 5 (FIG. 4a). The central control device 4 is designed to transmit control signals wirelessly to the various on-board control devices 5 of the various vehicles 3, which on-board control devices are designed to receive these control signals. The on-board control devices 5 may also be designed to send signals wirelessly, for example regarding the position of the associated vehicle 3, in which case the central control device 4 is designed to receive such signals.

The central control device 4 comprises a digitized grid of grid points 6 that are arranged according to a hexagonal pattern and represent the movement area 2. Each of the grid points 6 may be considered as a central grid point 6c that is surrounded by a maximum of six neighbouring grid points 6s, as shown by way of example in FIG. 2 for two interlying grid points 6c. For one of these two interlying grid points 6c, there are four neighbouring grid points 6s. For the other interlying grid point 6c, there are six neighbouring grid points 6s.

The distances between an interlying grid point 6c and each of the neighbouring grid points 6s are all equal and are denoted by the reference d in FIG. 2. The respective distance between adjacent neighbouring grid points 6s is also equal to d which is logical since each of the neighbouring grid points 6s could also be considered as an interlying grid point 6c which is likewise also surrounded by a maximum of six neighbouring grid points.

What is meant by a hexagonal pattern of grid points 6 in this case is that each of the grid points 6 can be considered as the centre of a (virtual) hexagonal cell or tile 7, where the tiles 7 placed one against the other together represent, just like the grid points 6, the movement area 2. The tiles 7 take the shape of a regular hexagon. Assuming that an interlying grid point 6c has six neighbouring grid points 6s, the three pairs of neighbouring grid points 6s located opposite one another relative to the interlying grid point 6c define three directional lines 8-1, 8-2 and 8-3 which are collectively denoted by the reference numeral 8, as shown in FIG. 1 for one grid point 6.

The central control device 4 and/or the on-board control devices 5 are designed such that the vehicles 3 move exclusively parallel to the three directional lines 8. This rule does not exclude that where the direction of movement of a vehicle changes from a first direction parallel to one of the three directional lines 8 to a second direction parallel to another of the three directional lines 8, the path of the vehicle 3 may follow a curved course instead of an angled course.

The above means that if a vehicle 3 moves from one tile 7 to another tile 7 within the movement area 2, which tiles are denoted in FIG. 1 by way of example by the reference numerals 7-1 and 7-2, respectively, where the direct connecting line 9 between the grid points 6 associated with these tiles 7-1, 7-2 does not run parallel to one of the three directional lines 8, vehicle 3 will move over a strip that comprises at least two strip portions 10-1, 10-2 that are connected to one another in a corner tile 7-3. In the corner tile 7-3, the strip portions 10-1 and 10-2 enclose an angle of 120 degrees with one another. The vehicle 3 turns on tile 7-3 by an angle of 60 degrees in a way that will be explained in more detail below. Depending on the relative positioning of two tiles 7 between which a vehicle 3 is moving, this angle on a corner tile 7-3 could also be 120 degrees or 180 degrees.

Figure 4B:
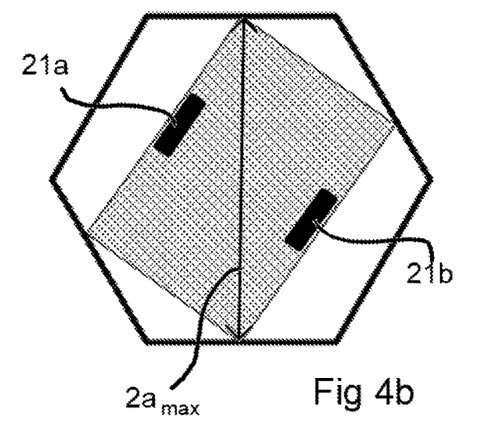

FIGS. 4a and 4b show a tile 7, more specifically a corner tile 7-3, on which a vehicle 3 is turning. To this end, each vehicle 3 is provided with two wheels 21a, 21b that are rotatable on respective axes of rotation 22a, 22b that run in line with one another in the middle of the length l of the vehicle 3. Wheels 21a, 21b can be driven independently of one another by on-board control device 5 in so far as wheels 21a, 21b rotate on the associated axes of rotation 22a, 22b at the same rotational speed so as to move vehicle 3 in a direction of movement that is parallel to the lengthwise direction of vehicle 3, and in so far as wheels 21a, 21b rotate on axes of rotation 22a, 22b at the same rotational speed but in opposite directions so as to turn vehicle 3 on a vertical axis of rotation that runs through the middle 23 of vehicle 3. It should be noted that other types of vehicles may be used, for example ones which are provided with two wheels like wheels 21a, 21b but the centre axes of which are not in line with one another. In relation to wheels 21a, 21b, one of the wheels would then be moved towards the front of the vehicle and the other of the wheels towards the rear. What matters is that the vehicles in question are turnable on a vertical turning axis that, viewed from above, lies within the periphery of the vehicle. It is also important that the vehicle stays within a corner tile, which is the tile in which a vehicle changes direction, despite the turning of the vehicle for the purpose of changing the direction thereof. This means that it may also be possible for the vehicle to move along and to turn simultaneously provided that the corner tile is large enough for this, or in other words, the vehicle is small enough for this.

The maximum distance between the centre 23 of vehicle 3 and a point on the periphery of vehicle 3 is $a_{max}$, which dimension can be easily be deduced in the present example, in which vehicle 3, viewed from above, is rectangular in shape, from the length l of vehicle 3 and from the width b of vehicle 3 using Pythagoras' theorem. Based on the above, the size of the diagonal of vehicle 3 that runs through the centre 23 of vehicle 3 is equal to twice $a_{max}$. The size of $a_{max}$ in relation to the size of d is such that, in this case, d is equal to 2.02 times $a_{max}$. Thus, it can be ensured that if the centre 23 of vehicle 3 is positioned directly above grid point 6 associated with corner tile 7-3, driving wheels 21a, 21b at the same time and at the same rotational speed but in opposite directions will lead to vehicle 3 turning on a vertical turning axis through centre 23, resulting in vehicle 3 staying just within the hexagonal periphery of corner tile 7-3. It can thus be guaranteed that turning vehicle 3 on a vertical axis through centre 23 within a tile 7 will not result in a collision with a vehicle 3 located on a neighbouring tile 7, even if this vehicle 3 is also turning on the centre 23 of said vehicle 3 at the same time.

Figure 3A:
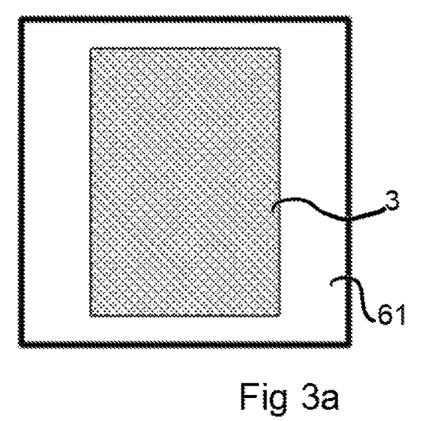
FIGS. 3a, 3b show an example of a tile with a vehicle thereon for comparative purposes.
Figure 3B:
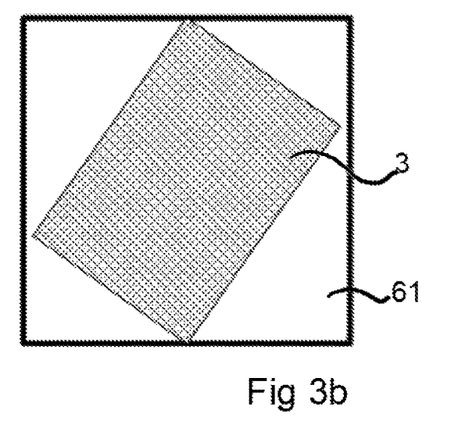

The hexagonal pattern in which the grid points 6 are arranged and hence consequently the hexagonal shape of the tiles 7 leads to a relatively high density of tiles 7, i.e. of grid points 6, in comparison with square tiles that are arranged according to a squared pattern of grid points. This can be seen in FIGS. 3a and 3b, where such a square tile is shown with a vehicle 3 that is of the same type and has the same dimensions as vehicle 3 as described in conjunction with FIGS. 4a and 4b. It can easily be deduced from FIGS. 3a to 4b that the size of the area of a tile 61 is equal to $d^2$ while the size of the area of a tile 7 is approximately equal to 0.87 times $d^2$. The required area for the same number of tiles 7 on which a vehicle 3 could turn is thus approximately 0.87 times the area that would be taken up by square tiles 61. The hexagonal pattern of grid points therefore allows more efficient use of the area of the movement area.

The hexagonal pattern of grid points 6 further affords the advantage that, on average, the distance that a vehicle 3 must cover to move between two tiles 7 within movement area 2 is smaller than the distance that a vehicle 3 would have to cover if the movement area were formed of square tiles 61, where there are only two directional lines oriented perpendicularly to one another.

With a view to the aforementioned aim of preventing collisions between vehicles 3, it is preferable for the width b of the vehicle 3, or more generally the maximum dimension of the vehicle 3 measured in a direction parallel to the axes of rotation 22a, 22b, to be at most equal to d, for example 0.98 times d. In this way it is possible to prevent a vehicle 3, moving parallel to one of the three directional lines 8 over mutually connected tiles 7, also encroaching upon a tile 7 located next to the tiles 7 in question where another vehicle 3 for example might just be turning on the vertical turning axis thereof.

Movement area 2 comprises, around the periphery thereof, a number of pick-up positions 51 that are formed by special tiles 7, in which there is a diamond in FIG. 1, where a vehicle positioned on such a tile 7 can be loaded with a product to be sorted, such as a package or an item of baggage, such a suitcase. This loading operation can be either manual or automated, in which the product in question is placed on a carrying member (not shown in greater detail) of the vehicle 3, with the product, viewed from above, staying within the periphery of the vehicle 3. The carrying member may for example be formed by a plate or tray that is rigidly connected to the chassis of the vehicle 3. After the product has been loaded onto the vehicle 3 and the product has been moved from a pick-up position 51 to a tile 7 that forms a destination position within movement area 2 for the product, the product may then be taken off the vehicle 3.

FIGS. 1 and 2 show a number of sorting positions 52 as black tiles at a distance from the periphery of the movement area 2. The sorting positions 52 are arranged in a hexagonal pattern where, between sorting positions located next to one another along any of the three directional lines 8-1, 8-2 and 8-3, two tiles 7 are present. Thus, pairs of two paths 41-1a, 41-1b, 41-2a, 41-2b and 41-3a, 41-3b of tiles 7, denoted collectively by reference numeral 41, run between the sorting positions 52 parallel to the directional lines 8. The controller of the system 1, as formed by the central control device 4 and the on-board control devices 5, is designed such that vehicles 3 move exclusively in opposite directions over the two paths of one pair. These opposite directions for the paths 41 are represented by arrows in FIG. 2. Allowing vehicles 3 to follow a path 41 in only one direction results in decreased computing power being needed to control vehicles 3 and in a lower risk of vehicles 3 colliding. Said opposite directions for paths 41 results in it being possible for a vehicle 3 to approach each tile 7 in at most three directions of approach and for a vehicle 3 that is positioned on a tile 7 to leave the tile 7 in at most three directions of departure, where none of the directions of departure is opposite one of the directions of approach.

Alternatively, it is incidentally also possible, for example, for there to be only one path between neighbouring sorting positions, in which case the direction of movement on the paths in question alternates.

In this exemplary embodiment, the sorting positions 52 take the form of holes in the floor. Chutes are connected to the holes, the lower ends of which lead out to a level located under the floor. All products that are earmarked for a given order can thus for example be collected via the same sorting position. To this end, the carrying members of the vehicles 3 are designed as a sideways-tiltable tray. Self-driving vehicles with such a tiltable tray are for example known from publications CN 208377742 U1 and WO 2018/214673 A1, the content of which documents should hereby be considered as incorporated within the present description, at least in so far as it relates to the description of the tiltable tray. When loading a vehicle 3 via the carrying member thereof, the tray in question is oriented horizontally, as is shown, for example, in FIGS. 5 and 6 in WO 2018/214673 A1. The vehicle 3 then moves to a tile 7 that is located next to a sorting position 52. Once there, the on-board controller 5 of the vehicle 3 controls the tray such that it tilts so that the tray assumes a sloping orientation in which the product in question slides off the tray and falls onto the chute of the sorting position in question. After this, the on-board controller 5 makes the tray tilt back into the horizontal orientation.

It is possible for the vehicle 3, when tilting the tray into the sloping orientation, not to be located exactly on a tile 7, but instead for the vehicle 3 to be located on two tiles 7 located next to one another within a path 41 as shown by way of example in FIG. 1 by vehicle 3-1 which, from the position shown, can drop a product into the hole in the floor associated with sorting position 52-1. In particular, but not exclusively, it may alternatively also be possible for the hexagonal shape of the sorting positions 52 to be turned by 30 degrees about the centre of the hexagonal shape.

Alternatively, it is also possible to fit vehicle 3 with another type of carrying member instead of said tray, in particular a carrying member that is provided with a conveyor belt or one or a number of conveyor strips. Self-driving vehicles with such a carrying member are for example known from publications CN 107963475 and CN 107323572, the content of which documents should hereby be considered as incorporated within the present description, at least in so far as it relates to the description of the carrying surface for products designed as a conveyor belt. The conveyor belt could also be replaced by two or more parallel conveyor strips. In any case, the conveyor belt or conveyor strips is/are then stationary after the vehicle 3 has been loaded with a product 3 at a pick-up position 51. In particular in the case of automated loading, the conveyor belt or conveyor strips would be driven simultaneously with a feed belt for products that connects to the conveyor belt or conveyor strips of vehicle 3. At a tile next to a sorting position 52, for example the position assumed by vehicle 3-1 in FIG. 1, the conveyor belt or conveyor strips are driven by the on-board controller 5 of the vehicle 3 in the direction of the sorting position 52, so that the product in question falls onto the chute at the sorting position 52/52-1.

The advantageous principles of the invention are also applicable to temporary storage systems such as also described in U.S. Pat. No. 7,912,574 B2. An important difference is that the self-driving vehicles used are then not determinative because the holding members, which can be considered as shelving units that are movable by the vehicles, protrude from the vehicles when they are carried by the vehicles. This means that the dimensions of the holding members are then determinative for the optimization of the size of the hexagonal tiles.

Figure 5:
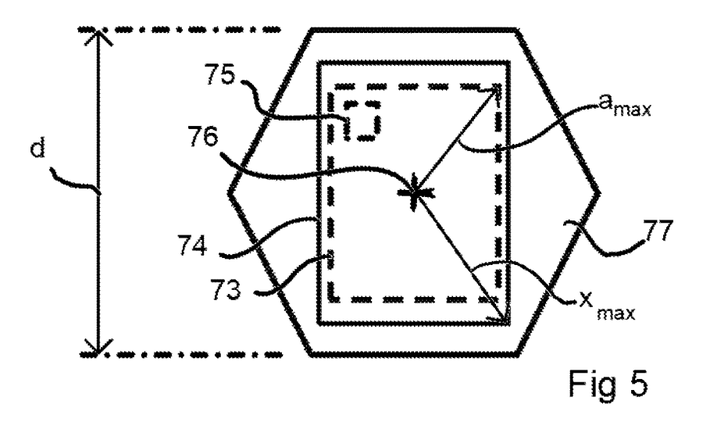
FIG. 5 shows a hexagonal tile with a vehicle and a product holder thereon.

FIG. 5 schematically shows an example of a hexagonal tile 77, which has the same dimensions as tiles 7, with a vehicle 73 thereon which is carrying a holding member 74 by means of a carrying member that is moveable up and down and controllable by means of the local controller 75. For a detailed description of the way in which vehicle 73 and the carrying member that is moveable up and down can be configured, reference is made to U.S. Pat. No. 7,912,574 B2, and more specifically to FIGS. 3A and 3B and the description thereof, which parts should hereby at least be considered as incorporated within the present description. Both vehicle 73 and holding member 74 are, viewed from above, rectangular in shape, with the centre of holding member 74 being positioned directly above the centre 76 of vehicle 73. Vehicle 73 is turnable on a vertical turning axis through said centre 76 thereof in the same way as vehicle 3.

The maximum distance between the centre 76 of vehicle 73 and a point on the periphery of vehicle 73 is $a_{max}$ and the maximum distance between the centre of holding member 74 and a point on the periphery of holding member 74 is $x_{max}$. It applies that $x_{max}$ is greater than $a_{max}$. For reasons similar to those given above for vehicle 3, it further applies that d is equal to 2.02 times $x_{max}$ and that the width of the holding member 74 is at most equal to d.

Figure 6:
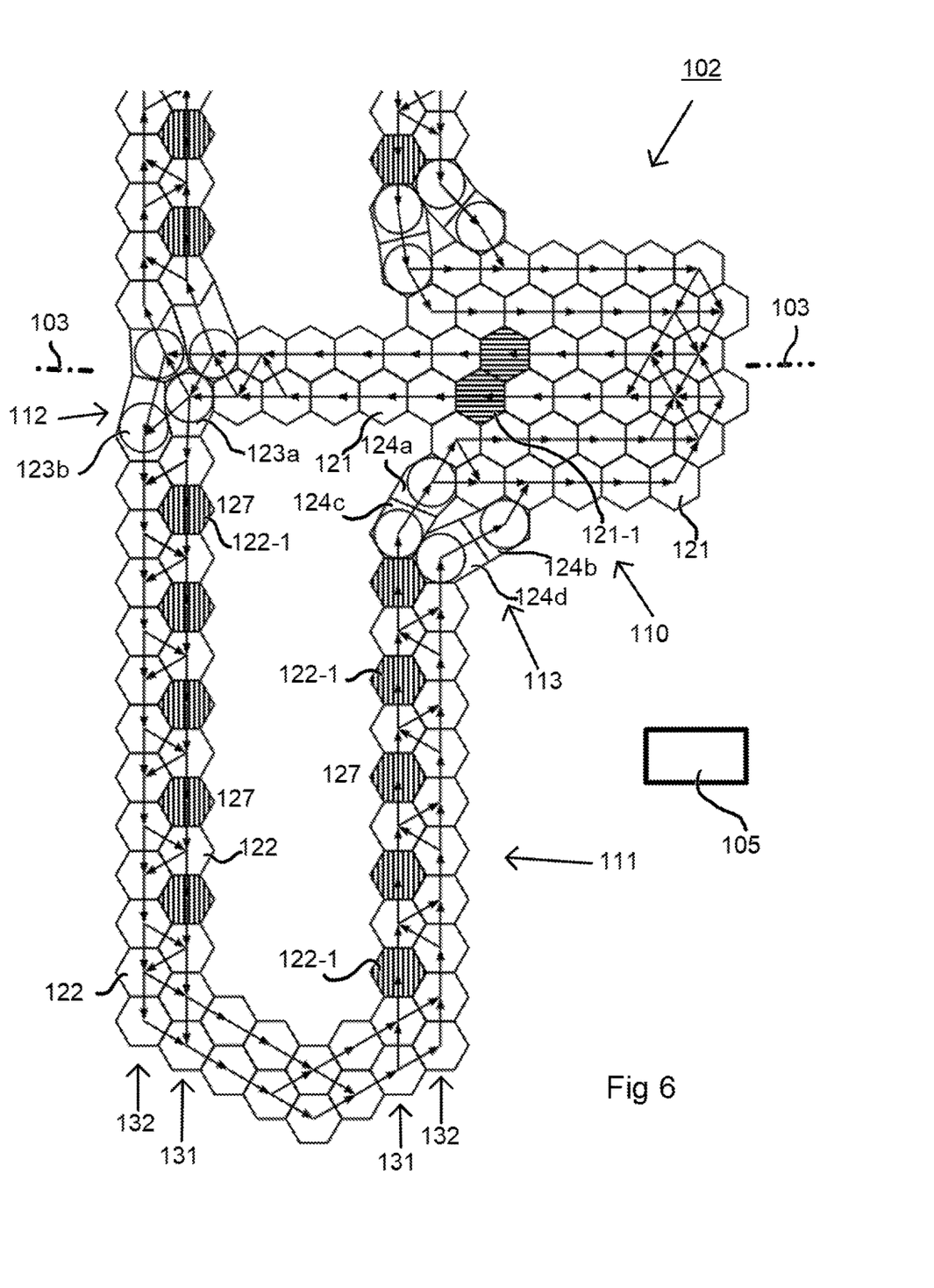
FIG. 6 shows a further example of a system according to the invention from above.

FIG. 6 shows the movement area 102 of a system according to the invention that is designed for sorting products. The system in question comprises vehicles (not shown in greater detail in FIG. 6) that are designed like the vehicles 3 described above. The portions of the movement area 102 located on either side of line 103 in FIG. 6 are similar in shape. The portion of movement area 102 located below line 103 is shown in its entirety while the portion of movement area 102 located above line 103 is shown only partially. Given the similarity between said portions of movement area 102, a description of the portion of the movement area 102 located below line 103 will suffice hereinafter.

The controller of the system, as formed by central control device 105 and the on-board control devices 5 of the vehicles 3 used, has modelled the movement area 102 as a first grid area 110 and a second, U-shaped grid area 111. The free ends of the two legs of the U-shape of the second grid area 111 connect to the first grid area 110 via third grid area 112 and fourth grid area 113. The first grid area 110 and the second grid area 111 each comprise a grid of respective grid points arranged in hexagonal patterns, each of which forms the centre of respective hexagonal tiles 121, 122. The hexagonal pattern associated with the first grid area 110 and the second grid area 111 are rotated relative to one another by an angle of 30 degrees, as a result of which the first grid area 110 and the second grid area 111 may be considered as being oriented at right angles to one another. The tiles 123*a*, 123*b* associated with the third grid area 112 and the tiles 124*a*, 124*b*, 124*c* and 124*d* have no clearly defined shape and are sufficiently large for a vehicle 3 to be able to turn therein without protruding beyond the periphery of the tiles 123, 124 in question in the process.

In the various tiles 121-124, arrows show the directions of approach in which a vehicle 3 can approach the tile in question and the directions of departure in which a vehicle can then move off said tile. The respective directions of approach and of departure for a tile, which are defined by the controller of the system, are never opposite one another. It is clear from the direction of the arrows that the controller is designed to move the vehicles essentially in a gyratory path, in which there is space for vehicles 3 to pass one another.

Tile 121-1 in the first grid area 110 forms a pick-up position where a vehicle 3, for example with the aid of a gantry robot (not shown in greater detail) or with a feed conveyor belt that runs above the vehicles 3, can be loaded with a product to be sorted. The vehicle 3 moves from tile 121-1 to the third grid area 112. Within each of the legs of the U-shape of the second grid area 11, five destination positions 122-1 are provided on sides of the two legs that are facing one another. A single tile 122 is in each case provided between neighbouring destination positions/tiles 122-1 of a leg. Each tile 122-1 can be approached only from the tile 122 located directly upstream and a vehicle can leave a tile 121-1 only for a downstream tile 122. Along the paths 131 of tiles 122 in which the five tiles 121-1 are included, passing paths 132 of tiles 122 are provided on the outside thereof within the legs of the U-shape. The destination positions 122-1 are each located next to respective sorting positions denoted by reference numeral 127, which for example could be in the form of a hole in the floor with a chute as described above with reference to FIGS. 1 and 2. A vehicle 3 that is positioned on a destination position 122-1 can thus, by activating the carrying member thereof, drop the product on the carrying member off at the sorting position 127 in question.

In an alternative embodiment, the second grid area 111 may also be replaced by an alternative second grid area with grid points that are arranged according to a rectangular, such as a squared, pattern.

Using a second grid area in which the pattern of grid points differs from the pattern of grid points of a first grid area makes it possible to connect differently oriented areas within a movement area, for example due to the structure of a building in which the movement area is located. Although the shape of the tiles of a third grid area by means of which the first grid area and the second grid area are connected to one another will then differ from that of the tiles in the first grid area and the second grid area, this still affords advantages in terms of the efficiency with which the area of the movement area is used.

The invention claimed is:

1. A system for intralogistic transport of products, comprising
    a number of vehicles, each vehicle being provided with an on-board control device for managing movement of the vehicle over a floor within a movement area, and with a carrying member that is designed at least to carry a product, wherein each vehicle is designed to turn on a vertical turning axis which, viewed from above, lies within periphery of the vehicle where, viewed from above, there is a maximum distance $a_{max}$ between the vertical turning axis and a point on the periphery of the vehicle, which point is located the furthest from the vertical turning axis in comparison with other points on the periphery; and
    a central control device that is designed to transmit a control signal to the on-board control devices, wherein the on-board control devices are designed to receive the control signals, wherein the central control device and/or the on-board control device of at least a portion of the number of vehicles comprise a digitized grid of grid points that represents the movement area or at least a portion thereof, which grid points are arranged at least partially according to a hexagonal pattern where the distance between an interlying grid point located away from the periphery of the movement area and any one of the neighbouring grid points that neighbour the grid point in question is equal to distance d, which distance d is greater than 2.0 times the maximum distance $a_{max}$, where three directional lines are determined such that each of the directional lines runs straight through two neighbouring grid points located directly opposite one another relative to the interlying grid point;
    wherein the central control device and/or the on-board control device of at least a portion of the number of vehicles are designed to move a vehicle from a first grid point to a second grid point within a strip that runs between the first grid point and the second grid point, where the direct connecting line between the first grid point and the second grid point does not run parallel to one of the three directional lines, which strip consists of at least two mutually connected straight strip portions, each of which runs parallel to one of the three directional lines.

2. The system according to claim 1, wherein distance d is smaller than 2.2 times the maximum distance $a_{max}$.

3. The system according to claim 1, wherein each vehicle, viewed from above, takes a rectangular shape with a length l and a width b.

4. The system according to claim 3, wherein a ratio of the width b to the length l is between 0.65 to 1.00 and 0.77 to 1.00.

5. The system according to claim 3, wherein the distance d is greater than twice the width of the vehicle.

6. The system according to claim 1, wherein the carrying member is designed to carry a product in a first state of the carrying member and to unload a product in a second state of the carrying member.

7. The system according to claim 6, wherein the carrying member assumes a horizontal orientation in the first state and a sloping orientation in the second state so as to tip a product off the carrying member under the effect of gravity in the second state.

8. The system according to claim 6, wherein the carrying member comprises a conveyor belt or conveyor strip that is designed to allow a product to rest thereon and to remain still in the first state and to be driven in the second state.

9. The system according to claim 1, wherein at least one pick-up position is provided within or directly adjacent to the movement area for a product to be picked up and carried from a pick-up position by the carrying member of a vehicle and wherein at least one delivery position is provided within or directly adjacent to the movement area for a product to be unloaded at a delivery position by the carrying member of the vehicle.

10. The system according to claim 9, wherein at least one delivery position comprises a hole in the floor.

11. The system according to claim 10, wherein a chute is connected to the hole in the floor.

12. The system for intralogistic transport of products, comprising
a number of vehicles, each vehicle being provided with an on-board control device for managing movement of the vehicle over a floor within a movement area, and with a carrying member that is designed at least to carry a holding member, wherein each vehicle is designed to turn on a vertical turning axis which, viewed from above, lies within periphery of the vehicle;
a number of holding members, each of which is designed to hold products, wherein each vehicle is designed to carry a holding member with the carrying member, with or without products held by the holding member, in a loaded state of the vehicle,
where, viewed from above, there is a maximum distance $a_{max}$ between the vertical turning axis and a point on the periphery of the vehicle, which point is located the furthest from the vertical turning axis in comparison with other points on the periphery, and there is a maximum distance $x_{max}$ between the vertical turning axis and a point on the periphery of the holding member carried by the vehicle, which point is located the furthest from the vertical turning axis in comparison with other points on the periphery of the holding member, where $x_{max}$ is greater than $a_{max}$; and
a central control device that is designed to transmit a control signal to the on-board control devices, wherein the on-board control devices are designed to receive the control signals, wherein the central control device and/or the on-board control device of at least a portion of the number of vehicles comprise a digitized grid of grid points that represents the movement area or at least a portion thereof, which grid points are arranged at least partially according to a hexagonal pattern where the distance between an interlying grid point located at a distance from the periphery of the movement area and any one of the neighbouring grid points that neighbour the grid point in question is equal to distance d, which distance d is greater than 2.0 times the maximum distance $x_{max}$, where three directional lines are determined such that each of the directional lines runs straight through two neighbouring grid points located directly opposite one another relative to the interlying grid point;
wherein the central control device and/or the on-board control device of at least a portion of the number of vehicles are designed to move a vehicle and a holding member carried by the vehicle from a first grid point to a second grid point within a strip that runs between the first grid point and the second grid point, where the direct connecting line between the first grid point and the second grid point does not run parallel to one of the three directional lines, which strip consists of at least two mutually connected straight strip portions, each of which runs parallel to one of the three directional lines.

13. The system according to claim 12, wherein distance d is smaller than 2.2 times the maximum distance $x_{max}$.

14. The system according to claim 12, wherein each holding member, viewed from above, takes a rectangular shape with a length l and a width b.

15. The system according to claim 14, wherein a ratio of the width b to the length l is between 0.65 to 1.00 and 0.77 to 1.00.

16. The system according to claim 14, wherein the distance d is greater than twice the width of the holding member.

17. The system according to claim 12, wherein the carrying member and the holding member are designed for the holding member to be carried in a first state of the carrying member and for the holding member to be unloaded in a second state of the carrying member.

18. The system according to claim 17, wherein the carrying member operates in the first state so as to lift a holding member up off the floor and in the second state so as to set the holding member down on the floor on legs thereof in the second state.

19. The system according to claim 12, wherein at least one pick-up position is provided within the movement area for a holding member to be lifted up off the floor at a pick-up position by the carrying member of a vehicle and wherein at least one delivery position is provided within the movement area for the holding member to be set down on the floor at a delivery position.

20. The system according to claim 12, wherein the central control device and/or the on-board control device of at least a portion of the number of vehicles are designed to allow a vehicle to reach an interlying grid point from a grid point neighbouring the interlying grid point exclusively in at most five directions of approach and subsequently then to leave an interlying grid point for a grid point neighbouring the interlying grid point exclusively in at most five directions of departure, where the directions of approach and of departure in question are not opposite one another.

21. The system according to claim 12, wherein the central control device and/or the on-board control device of at least a portion of the number of vehicles comprise, within a first grid area, a digitized first grid portion of first grid points that represents a first portion of the movement area, which first grid points are arranged according to a first hexagonal pattern, and comprise, within a second grid area, a digitized second grid portion of grid points that represents a second portion of the movement area, which grid points are arranged according to a second hexagonal pattern, and comprise a third area that comprises at least one grid point between the first grid area and the second grid area where the first hexagonal pattern and the second hexagonal pattern are rotated relative to one another by an angle.

22. The system according to claim 21, wherein the first hexagonal pattern and the second hexagonal pattern are rotated relative to one another by an angle of 30 degrees.

23. The system according to claim 12, wherein the central control device and/or the on-board control device of at least a portion of the number of vehicles comprise, within a first grid area, a digitized first grid portion of first grid points that represents a first portion of the movement area, which first grid points are arranged according to a first hexagonal pattern, and comprise, within a second grid area, a digitized second grid portion of grid points that represents a second portion of the movement area, which grid points are arranged according to at least one of a rectangular pattern or a squared pattern, and comprise a third area that comprises at least one grid point between the first grid area and the second grid area.

24. The system according to claim 19, wherein the system comprises a number of delivery positions that are provided in a regular pattern in rows within the movement area, which rows run parallel to the three directional lines, and wherein a least one row of grid points is provided between neighbouring rows of delivery positions, which row of grid points runs parallel to rows of delivery positions, where the central control device and/or the on-board control device of at least a portion of the number of vehicles are designed to move vehicles over the grid points of a row in only one direction of movement.

25. The system according to claim 24, wherein two rows of grid points are provided between neighbouring rows of delivery positions, where the central control device and/or the on-board control device of at least a portion of the number of vehicles are designed to move vehicles over the grid points of a first row of the two rows of grid points and of a second row of the two rows of grid points in opposite directions of movement.

26. The system according to claim 24, wherein single rows of grid points are provided between neighbouring rows of delivery positions.

27. The system according to claim 26, wherein the central control device and/or the on-board control device of at least a portion of the number of vehicles are designed to move vehicles over the grid points of neighbouring rows of grid points in opposite directions of movement.

28. A method for using a system according to claim 1, comprising:
    picking up and carrying a product from a third grid point using the carrying member of a vehicle where, viewed from above, the product is positioned within the periphery of the vehicle; and
    moving the vehicle with the product from a first grid point to a second grid point within a strip that runs between the first grid point and the second grid point, where the direct connecting line between the first grid point and the second grid point does not run parallel to one of the three directional lines, where the strip consists of at least two mutually connected straight strip portions, each of which runs parallel to and over one of the three directional lines.

29. A method for using a system according to claim 12, comprising:
    picking up and carrying a holding member from a third grid point using the carrying member of a vehicle; and
    moving the vehicle with the holding member from a first grid point to a second grid point within a strip that runs between the first grid point and the second grid point, where the direct connecting line between the first grid point and the second grid point does not run parallel to one of the three directional lines, where the strip consists of at least two mutually connected straight strip portions, each of which runs parallel to and over one of the three directional lines.

* * * * *